United States Patent
Wall

[11] Patent Number: 5,809,936
[45] Date of Patent: Sep. 22, 1998

[54] SUBTERRANEAN ANIMAL SANCTUARY

[76] Inventor: Ryan A. Wall, 2512 Richland Ave., Metairie, La. 70001

[21] Appl. No.: 780,364

[22] Filed: Jan. 9, 1997

[51] Int. Cl.$^6$ .............................. E06B 7/02; E02D 29/00; A01K 1/03
[52] U.S. Cl. .......................... 119/484; 119/486; 119/500; 52/169.6; 52/220.8; 454/200
[58] Field of Search ..................................... 119/486, 484, 119/500, 65; 52/169.6, 220.8; 454/197, 200, 208, 902

[56] References Cited

U.S. PATENT DOCUMENTS

| | | | |
|---|---|---|---|
| 1,549,229 | 8/1925 | Smithline | 119/486 |
| 1,851,188 | 3/1932 | Kibble | 119/486 |
| 2,034,156 | 3/1936 | Snider | 119/486 |
| 2,324,339 | 7/1943 | Vanheissum | 119/486 |
| 2,358,588 | 9/1944 | Palmer | 119/486 |
| 2,795,208 | 8/1957 | Rasmussen | 119/486 |
| 3,096,933 | 7/1963 | Bora | 454/200 |
| 3,212,220 | 10/1965 | Boniecki et al. | 52/169.6 |
| 3,227,061 | 1/1966 | Swayze | 52/169.6 |
| 4,226,062 | 10/1980 | Doane | 52/169.6 |
| 4,237,963 | 12/1980 | Girard | 165/1 |
| 4,539,780 | 9/1985 | Rice | 52/169 |
| 4,567,939 | 2/1986 | Dumbeck | 52/169.6 |
| 4,686,804 | 8/1987 | Smith | 52/169.6 |
| 4,827,872 | 5/1989 | Sommers | 119/500 |
| 5,448,965 | 9/1995 | McClure | 119/482 |

Primary Examiner—Edgar S. Burr
Assistant Examiner—Leslie Grohusky
Attorney, Agent, or Firm—Joseph N. Breaux

[57] ABSTRACT

A subterranean animal sanctuary for housing an animal underground in a comfortable habitat. The subterranean animal sanctuary comprises a housing, a sanctuary foyer for providing unhindered entry and exit of an animal, an air and heating venting system coupled to a main residence and the housing for supplying cooled air or heated air to the housing, and a ventilation outlet conduit for automatically refreshing the air within the housing with clean and aromatically pleasing air.

6 Claims, 3 Drawing Sheets

SUBTERRANEAN ANIMAL SANCTUARY

TECHNICAL FIELD

The present invention relates to underground animal shelters and more particularly to a subterranean animal sanctuary having vented thereto, from the main residence, air conditioning or heating for providing a comfortable habitat for the animal without significant increases in electric and/or gas usage. Henceforth, the subterranean animal sanctuary provides a comfortable habitat for the propagation and hibernation of domesticated and wild animals.

BACKGROUND OF THE INVENTION

Dog houses and other animal shelters are readily used to shelter domesticated animals outdoors. In some instances, large animals are housed outside to prevent animal odors from permeating the residence. However, outdoor animals need a comfortable habitat for birthing and raising their young. Additionally, since in most cases both husband and wife work out of the home, no one is available to let the pet outside for regular bathroom visits. Therefore, during working hours, regardless of the weather conditions, the pet is placed outdoors. During adverse temperatures and weather conditions, unless the pet is brought inside, the animal will be severely uncomfortable in such conditions as rain, snow, thunderstorms, and heat waves.

Several animal shelters have been patented which are aimed at providing a comfortable habitat for an animal.

U.S. Pat. Nos. 1,851,188, 1,549,229, 2,324,339 and 2,358,588 are directed to underground animal shelters but do not meet the needs of the present invention. Specifically, the subterranean animal sanctuary of the present invention departs from the above-mentioned U.S. Patents in that the subterranean animal sanctuary has vented thereto, from the main residence, air conditioning or heating for providing a comfortable habitat for the animal without significant increases in gas or electric usage. Moreover, the subterranean animal sanctuary requires minimal excavation of the earth's terrain.

SUMMARY OF THE INVENTION

The preferred embodiment of the subterranean animal sanctuary of the present invention solves the aforementioned problems in a straight forward and simple manner. What is provided is a subterranean animal sanctuary having vented thereto, from the main residence, air conditioning or heating for providing a comfortable habitat for the animal without significant increases in electric and/or gas usage. Moreover, the subterranean animal sanctuary provides a comfortable habitat for the propagation and hibernation of domesticated and wild animals.

The subterranean animal sanctuary comprises a housing, a sanctuary foyer for providing unhindered entry and exit of an animal, an air and heating venting system coupled to a main residence and the housing for supplying cooled air or heated air to the housing, and a ventilation outlet conduit for automatically refreshing the air within the housing with clean and aromatically pleasing air.

In view of the above, it is an object of the present invention to provide a novel air and heating venting system for venting cooled air or heated air from the main residence to an insulated housing for providing a comfortable habitat for the animal without significant increases in electric and/or gas usage. Moreover, a ventilation outlet conduit is provided ventilation of the air in the insulated housing. Henceforth, the air in the housing is automatically refreshed with clean and aromatically pleasing air.

Another object of the invention is to provide a subterranean animal sanctuary having a removable lid member thereby providing an entrance into the confines of the subterranean animal sanctuary for the cleaning and the sanitizing thereof.

A further object of the invention is to provide a subterranean animal sanctuary comprising a housing having a sealing means between the removable lid member and a rectangular box structure for moisture-proofing the subterranean animal sanctuary thereby preventing seepage from entering the housing.

It is still a further object of the invention is to provide a subterranean animal sanctuary having a door means which allows the unhindered entrance and exit of the animal. For example, the animal may come and go in and out of the subterranean animal sanctuary without any human aid to use the bathroom. The door means also prevents precipitation from collecting within the confines of the subterranean animal sanctuary.

It is still a further object of the invention is to provide a subterranean animal sanctuary which is insulated for providing thermal protection from any above ground weather elements and maintaining therein cooled air or heated air from the air and heating venting system.

In view of the above objects, a feature of the present invention is to provide a subterranean animal sanctuary having a stream line construction which is readily adaptable to comfortably shelter substantially any domesticated or wild life animal.

Another feature of the present invention is to provide a subterranean animal sanctuary which requires simple excavation of the earth's terrain in order to install the subterranean animal sanctuary.

A further feature of the present invention is to provide a subterranean animal sanctuary which is simple to use and inexpensive to manufacture.

The above objects and other features of the present invention will become apparent from the drawings, the description given herein, and the appended claims.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
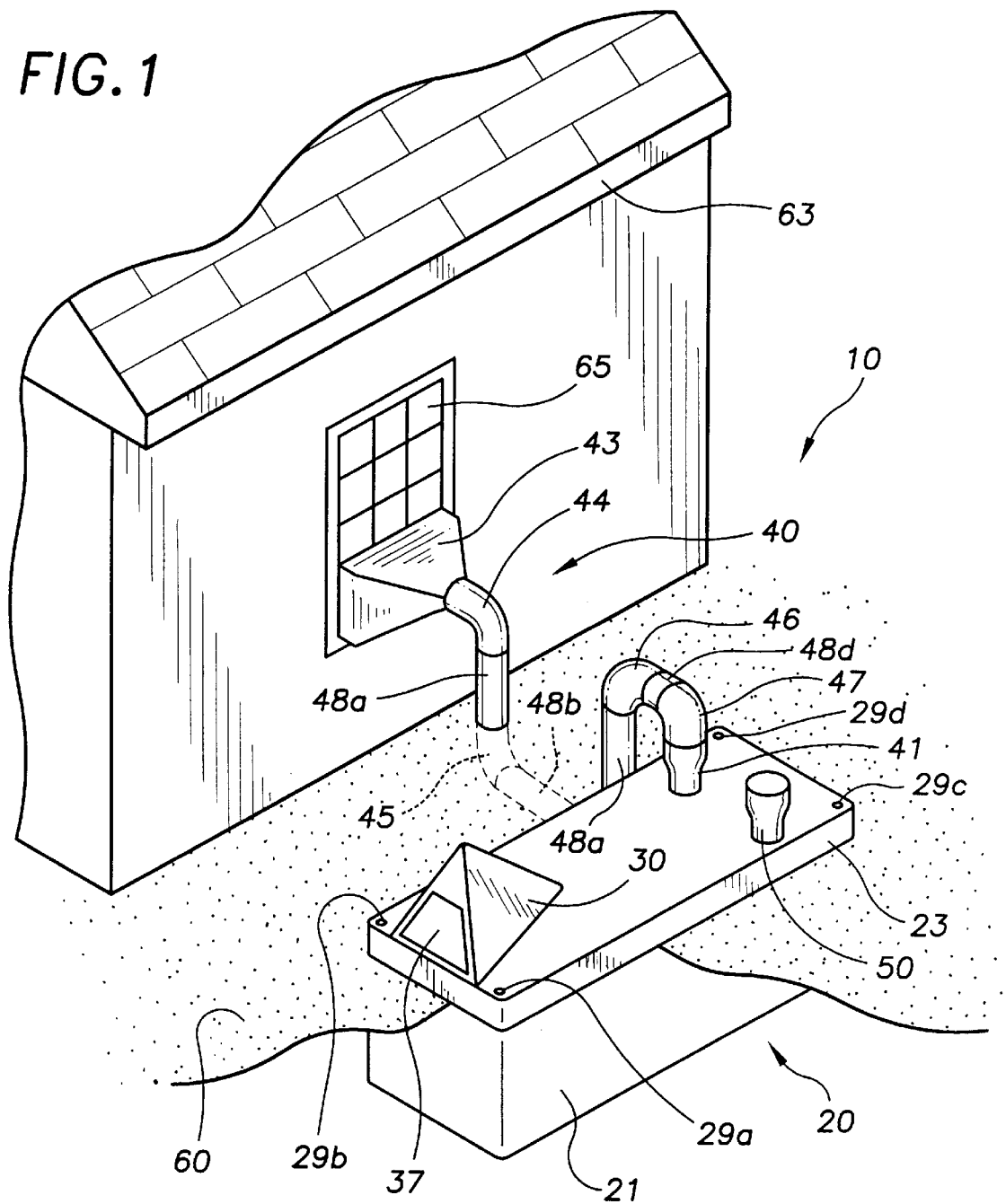
FIG. 1 illustrates a subterranean view of the subterranean animal sanctuary of the present invention deployed in use.

Referring now to the drawings, and in particular FIG. 1, the subterranean animal sanctuary of the present invention is designated generally by the numeral 10. Subterranean animal sanctuary 10 is generally comprised of housing 20, sanctuary foyer 30, air and heating venting system 40 and ventilation outlet conduit 50.

Figure 2:
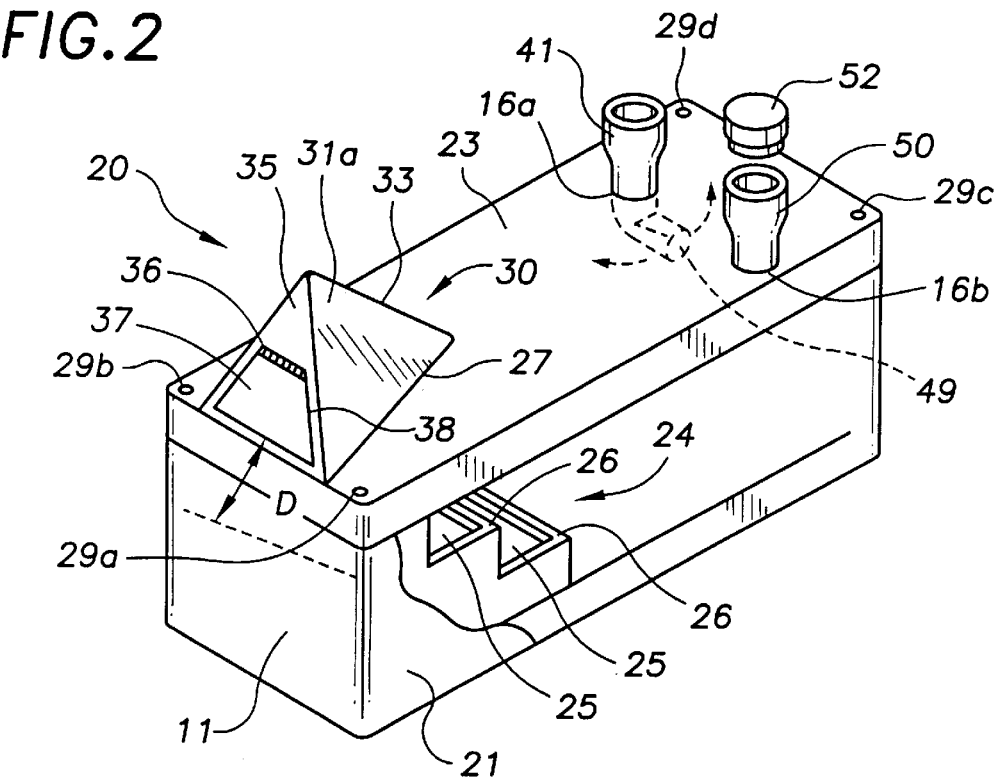
FIG. 2 illustrates a perspective view of the housing of the subterranean animal sanctuary, having a cut-away section, of the present invention of FIG. 1.
Figure 3:
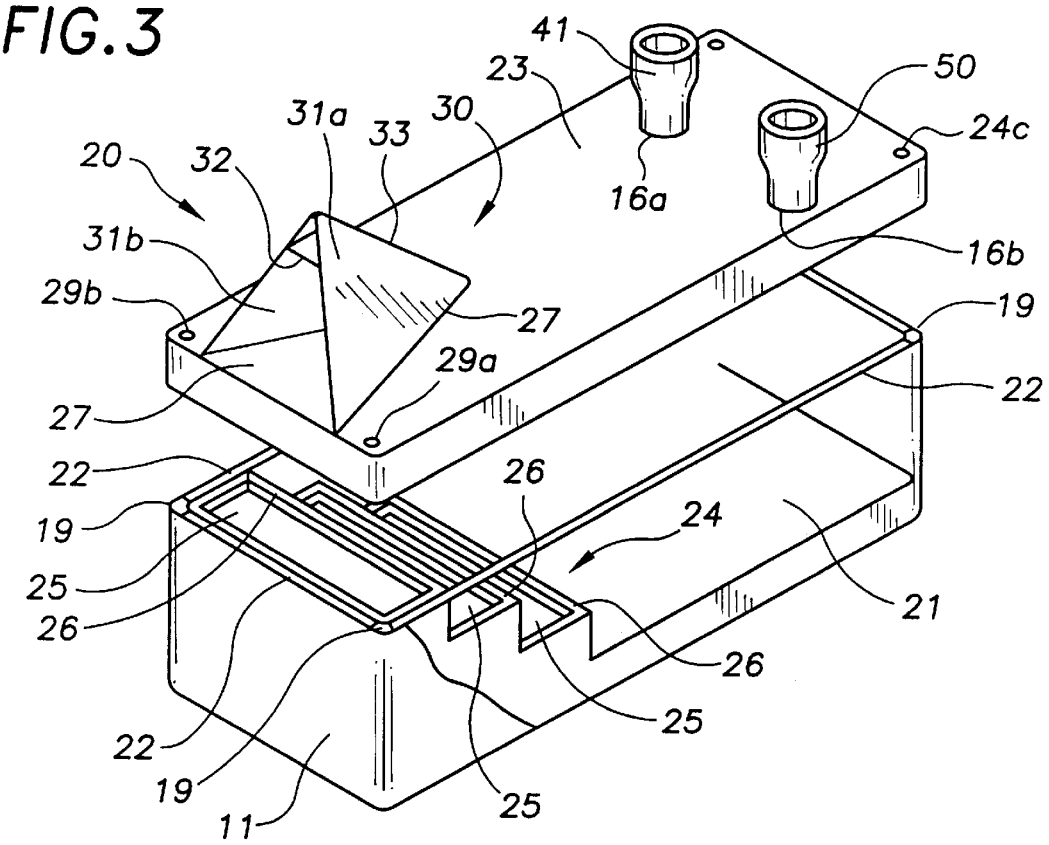
FIG. 3 illustrates a perspective view of the housing of the subterranean animal sanctuary, having a cut-away section, a raised lid member and the door means removed, of the present invention of FIG. 1.
Figure 4:
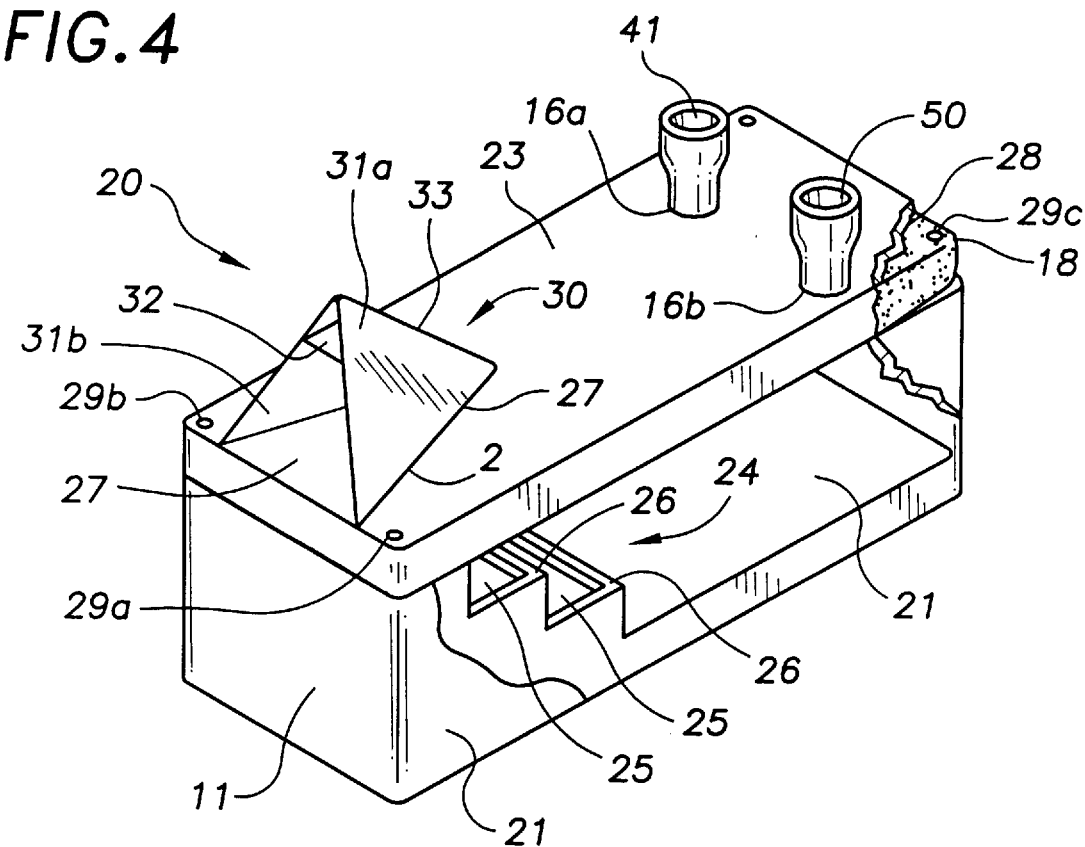
FIG. 4 illustrates a perspective view of the housing of the subterranean animal sanctuary, having a cut-away section illustrating the insulation of the housing and the door means removed, of the present invention of FIG. 1.

Referring now to FIGS. 2–4, detailed perspective views of the housing are illustrated. Housing 20 comprises four insulated walls and a bottom insulated floor unitarily coupled together to form rectangular box structure 21, lid member 23 and sealing means 22 (FIG. 3). Said four walls, said bottom floor and lid member 23 are insulated, as shown in FIG. 4, thereby thermally protecting the animal from any above ground weather elements and maintaining the cooled air or heated air from the air and heating venting system. As shown in FIG. 3, the top wall edges of rectangular box structure 21 have fixedly coupled thereto sealing means 22 for moisture-proofing housing 20. Each of the four corners of said top wall edges of rectangular box structure 21 has formed therein threaded apertures 19.

In the exemplary embodiment, housing 20 is made of polyethylene plastic; however, any durable plastic material or the like which are highly durable under adverse weather conditions and for subterranean habitation may be substituted. Preferably, sealing means 22 is comprised of a rubber gasket or the like.

Lid member 23 is a rectangular shaped member constructed from an outer plastic shell 28 having embedded therein lid insulating member 18, as shown in FIG. 4. In the exemplary embodiment, insulation member 18 is made of polyurethane foam which provides an exceptional thermal protection from any above ground weather elements. Nevertheless, any insulating material providing thermal protection may be substituted.

Lid member 23 comprises two circular apertures 16a and 16b for receiving therein inlet conduit 41 of air and heating venting system 40 and ventilation outlet conduit 50. Lid member 23 further comprises triangular aperture 27 having coupled thereto sanctuary foyer 30 and four lid securing apertures 29a, 29b, 29c and 29d. Each of the four lid securing apertures 29a, 29b, 29c and 29d pass therethrough a securing means (not shown), such as a screw or bolt, to a respective one of threaded apertures 19 for securing lid member 23 to rectangular box structure 21. As each of the securing means (not shown) is screwed into the respective one of threaded apertures 19, the bottom surface of lid member 23 is compressed toward sealing means 22 to form a seal thereby moisture-proofing housing 20 to prevent water seepage from the surface of the earth's terrain 60 from entering the confines of rectangular box structure 21.

Housing 20 further comprises staircase 24. Staircase 24 comprises a plurality of steps for allowing the animal to walk down into the confines of rectangular box structure 21. Each of the plurality of steps has formed therein rectangular recess 25 for forming a step surface. In the exemplary embodiment, staircase 24 is also made of polyethylene plastic or the like. The smooth surface of polyethylene plastic does not allow an animal to adequately grip the step surface with its paws. As a result, wall surfaces 26 of rectangular recess 25 surrounds each said step surface thereby preventing the animal from sliding down the plurality of steps when entering the confines of rectangular box structure 21. Moreover, wall surfaces 26 of rectangular recess 25 surrounding each said step surface further allows precipitation, such as water, to collect within rectangular recess 25.

The plurality of steps of staircase 24 are angled away from short wall surface 11. The area behind the plurality of steps of staircase 24 is hollow wherein the hollow area behind staircase 24 reduces the overall weight of housing 20. Therefore, in the event of significant flooding, rectangular box structure 21 may rise with the water level thereby permitting housing 20 of subterranean animal sanctuary 10 to remain afloat and preventing injury or harm to the animal.

Sanctuary foyer 30 comprises first triangularly shaped wall 31a and second triangularly shaped wall 31b and support brace member 32. First triangularly shaped wall 31a and second triangularly shaped wall 31b are substantially isosceles triangles wherein leg 32a and leg 32b are fixedly coupled to the top surfaces of lid member 23 such that first wall leg 32a and second wall leg 32b surrounds triangular aperture 27. The other legs of first triangularly shaped wall 31a and second triangularly shaped wall 31b are fixedly coupled together to form apex 33. Henceforth, first triangularly shaped wall 31a and second triangularly shaped wall 31b are sloping outward from apex 33 to first wall leg 32a and second wall leg 32b thereby providing a chute means for running off precipitation. Moreover, apex 33 forms a tunneling means for directing the pet/animal down staircase 24 and into the confines of housing 20. Support brace member 32 is coupled to the interior top portion surfaces of first triangularly shaped wall 31a and second triangularly shaped wall 31b, respectively, in relative close proximity to apex 33 for preventing first triangularly shaped wall 31a and second triangularly shaped wall 31b from caving inward. Support brace member 32 should be positioned strategically for providing stability without harm or injury to the entering animal.

In the preferred embodiment, sanctuary foyer 30 is arranged and constructed such that the entry point is positioned along one distal end of lid member 23. Positioning said entry point along one distal end of lid member 23 prevents any accumulation of precipitation such as rain on top of lid member 23 from flooding the interior of rectangular box structure 21 via said entry point.

Sanctuary foyer 30 further comprises door means 34. Door means 34 comprises front triangular wall 35, pivot hinge member 36 and flap member 37. Front triangular wall 35 fixedly couples to the bases of first triangularly shaped wall 31a and second triangularly shaped wall 31b and the top surface of lid member 23. Front triangular wall 35 has formed therein entry point aperture 38, a quasi-triangularly shaped aperture. Entry point aperture 38 is positioned distance D above the earth's terrain 60 for preventing dirt and/or water from entering therein. Flap member 37 is quasi-triangularly shaped to conform to the contour of entry point aperture 38. Front triangular wall 35 and quasi-triangularly shaped flap member 37 enclose sanctuary foyer 30 thereby by preventing a down poring of precipitation from entering therein. Pivot hinge member 36 couples to a top edge of flap member 37 and a bottom edge of front triangular wall 35 whereby flap member 37 freely rotates in and out of sanctuary foyer 30. Door means 34 is adapted to allow the unhindered entrance and exit of the animal. For example, the animal may come and go in and out of subterranean animal sanctuary 10 without any human aid to use the bathroom.

It can be readily seen that the dimensions of housing 20 and sanctuary foyer 30 may be varied to accommodate domesticated and wild animals of various shapes and sizes; henceforth, the streamline construction is readily adaptable to comfortably shelter substantially any domesticated or wild life animal. Additionally, the door means 34 may be omitted. The pet/animal will simply enter via the open entry point.

Figure 5:
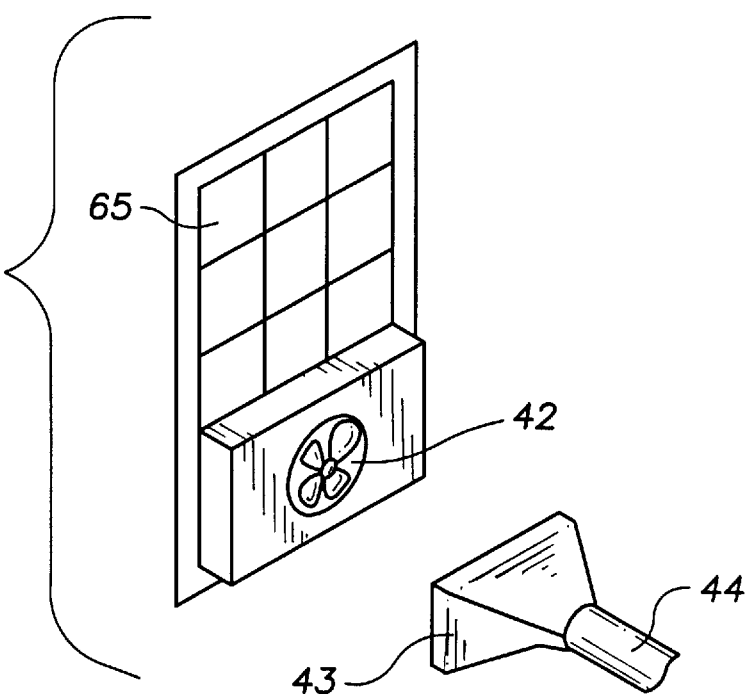
FIG. 5 illustrates a detailed view of the venting conduit from the main residence of FIG. 1.

Referring to FIG. 5 and again to FIG. 1, air and heating venting system 40 comprises inlet conduit 41, fan siphoning means 42, funnel 43, first elbow conduit 44, second elbow conduit 45, a third elbow conduit (not shown), forth elbow conduit 46, fifth elbow conduit 47 and a plurality of varying length connecting conduits 48a, 48b, 48c and 48d. Inlet conduit 41, first elbow conduit 44, second elbow conduit 45, a third elbow conduit (not shown), forth elbow conduit 46, fifth elbow conduit 47 and the plurality of varying length connecting conduits 48a, 48b, 48c and 48d form an air transport means for transferring air from main residence 63 to housing 20. Fan siphoning means 42 comprises a fan housed in a fan housing wherein said fan housing is adapted to be tightly secured to a lower portion of window 65 of main residence 63. Although not shown, fan siphoning means 42 couples to a conventional wall outlet for receiving power. Furthermore fan siphoning means 42 comprises an on/off switch (not shown) positioned in the interior of main residence 63 thereby enabling the pet/animal owner to turn on and off the air and heating venting system 40. Preferable, subterranean animal sanctuary 10 is placed in relative close proximity to main residence 63 to minimize the length and complexity of the plurality of varying length connecting conduits 48a, 48b, 48c, and 48d.

In the exemplary embodiment, inlet conduit 41 and the plurality of varying length connecting conduits 48a, 48b, 48c and 48d are PVC tubing. Nevertheless, any durable plastic tubing may be substituted.

Fan siphoning means 42 has fixedly coupled thereto funnel 43 wherein funnel 43 is dimensioned to mate with the outer perimeter of said fan housing. Funnel 43 has fixedly coupled thereto one open end of first elbow conduit 44 so that connecting conduit 48a is slightly distanced from the exterior wall of main residence 63. Connecting conduit 48a is substantially parallel with said exterior wall and one distal end of connecting conduit 48a fixedly couples to an open end of second elbow conduit 45. The other open end of second elbow conduit 45 has fixedly coupled thereto one distal end of connecting conduit 48b. The other distal end of connecting conduit 48b has fixedly coupled thereto an open end of the third elbow conduit (not shown). The other open end of the third elbow conduit (not shown) has fixedly coupled thereto one distal end of connecting conduit 48c. Connecting conduit 48c is substantially parallel to connecting conduit 48a and the vertical surface of rectangular box structure 21. In the exemplary embodiment, connecting conduit 48c, second elbow conduit 45 and the third elbow conduit are housed underground thereby preventing accidental breakage of the conduits.

The other distal end of connecting conduit 48c fixedly couples to one open end of fourth elbow conduit 46. The other open end of fourth elbow conduit 46 is fixedly coupled to one distal end of connecting conduit 48d. The other distal end of connecting conduit 48d couples to one open end of fifth elbow conduit 47. The other open end of fifth elbow conduit 47 couples to inlet conduit 41.

As shown in FIG. 2, inlet conduit 41 is tightly secured in aperture 16a such that water does not seep into housing 20. The portion of inlet conduit 41 in the interior of housing 20 has coupled thereto flow control member 49. Flow control member 49 is, preferably, rotatable to enhance the air flow into the confines of housing 20. Additionally, the rotatable properties of flow control member 49 allow flow control member 49 to be freely moved out of harms way. Flow control member 49 is angled 90 degrees to minimize its protrusion into the confines of housing 20.

In operation, fan siphoning means 42 transfers the air from the main residence 63 to housing 20 via funnel 43 and the connected conduits of the air transport means, described above. Henceforth, housing 20 is cooled or heated without significant increases in electric and/or gas usage. Nevertheless, subterranean animal sanctuary 10 may be equipped with its own air blower system.

Ventilation outlet conduit 50 is tightly secured in aperture 16b such that water does not seep into housing 20. Ventilation outlet conduit 50 has removably coupled thereto cap member 52 wherein cap member 52 is used to close the exterior open distal end of ventilation outlet conduit 50 during adverse weather conditions or as necessary. Ventilation outlet conduit 50 provides ventilation of the air in housing 20 wherein, as air is supplied to housing 20 from main residence 63, the stale air in housing 20 is forcibly sent out of ventilation outlet conduit 50. Henceforth, the air in housing 20 is automatically refreshed with clean and aromatically pleasing air.

As illustrated in FIG. 1, the subterranean animal sanctuary 10 of the present invention is deployed in use. In order to deploy subterranean animal sanctuary 10 in use, preferably, in relative close proximity to the main residence 63, the earth's terrain 60 is excavated to the dimensions of rectangular box structure 21 of housing 20 and connecting conduit 48c, second elbow conduit 45, and the third elbow conduit of air and heating venting system 40. Since describing the installation of subterranean animal sanctuary 10 for all possible dimensions is prohibitive, a description of the installation for a 32-inch deep rectangular box structure 21 is provided below. Preferably, the depth of the excavated terrain 60 should be approximately 24 inches deep thereby 24 inches of rectangular box structure 21 are subterranean and 8 inches are above ground. The 8-inch portion of rectangular box structure 21, above ground, places the entry point sufficiently above the earth's terrain 60 thereby reducing the possibility of flooding in rectangular box structure 21 via triangular aperture 27 during a down pour. Preferably, lid member 23 remains uncovered by dirt or the like so that the pet/animal owner can have easy unobstructed access to the interior of housing 20 for the cleaning and sanitizing thereof.

It is noted that the embodiment of the subterranean animal sanctuary 10 described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A subterranean animal sanctuary comprising:

a housing including a box structure having formed therein a staircase, a lid member having a top surface removably coupled to said box structure, and a means for sealing coupled to top wall edges of said box structure for sealing the mating of said lid member to said box structure;

a sanctuary foyer, coupled to said housing, having a door means for providing unhindered entry and exit of an animal;

air and heating venting system coupled said housing for supplying cooled air or heated air to said housing; and a ventilation outlet conduit for refreshing the air within said housing;

said sanctuary foyer including a first sloping triangularly shaped wall, a second sloping triangularly shaped wall coupled to said first sloping triangularly shaped wall to form an apex wherein said apex forms a tunneling means for directing an animal down said staircase and into the confines of said housing, and a support brace member coupled to said first sloping triangularly shaped wall and said second sloping triangularly shaped wall in close proximity to said apex;

wherein a leg of said first triangularly shaped wall and a leg of said second triangularly shaped wall are fixedly coupled to said top surface of said lid member surrounding a triangular aperture formed in said lid member.

2. The subterranean animal sanctuary of claim 1, wherein said sanctuary foyer further comprises:

a front triangular wall having formed therein an entry point aperture;

a pivot hinge member coupled to said front triangular wall; and a flap member coupled to said pivot hinge member and dimensioned to cover said entry point aperture wherein said flap member freely rotates in and out of said entry point aperture for providing unhindered entry and exit of an animal.

3. An animal sanctuary comprising:

a housing, wherein said housing comprises:
  a box structure having formed therein a staircase,
  a lid member having a top surface removably coupled to said box structure, and
  a means for sealing coupled to top wall edges of said box structure for sealing the mating of said lid member to said box structure;

a sanctuary foyer, coupled to said housing, having a door means for providing unhindered entry and exit of an animal;

air and heating venting system coupled to said housing for supplying cooled air or heated air to said housing; and a ventilation outlet conduit for refreshing the air within said housing;

said sanctuary foyer further comprising:
  a first sloping triangularly shaped wall,
  a second sloping triangularly shaped wall coupled to said first sloping triangularly shaped wall to form an apex, and
  a support brace member coupled to said first sloping triangularly shaped wall and said second sloping triangularly shaped wall in close proximity to said apex wherein said apex forms a tunneling means for directing an animal down said staircase and into the confines of said housing;

wherein a leg of said first triangularly shaped wall and a leg of said second triangularly shaped wall are fixedly coupled to the top surface of said lid member surrounding a triangular aperture formed in said lid member.

4. The subterranean animal sanctuary of claim 3, wherein said sanctuary foyer further comprises:

a front triangular wall having formed therein an entry point aperture;

a pivot hinge member coupled to said front triangular wall; and a flap member coupled to said pivot hinge member and dimensioned to cover said entry point aperture wherein said flap member freely rotates in and out of said entry point aperture for providing unhindered entry and exit of an animal.

5. A subterranean animal sanctuary comprising:

an insulated housing including a lid member having a top surface;

a sanctuary foyer, coupled to said housing, having a door means for providing unhindered entry and exit of an animal;

air and heating venting system coupled to said housing for supplying cooled air or heated air to said housing wherein said air and heating venting system comprises:
  a fan member,
  a funnel coupled to said fan member, and
  a means for transporting air coupled to said funnel and said housing for transferring the cooled air or the heated air to said housing; and a ventilation outlet conduit for refreshing the air within said housing;

said sanctuary foyer further comprising:

a first sloping triangularly shaped wall;

a second sloping triangularly shaped wall coupled to said first sloping triangularly shaped wall to form an apex; and a support brace member coupled to said first sloping triangularly shaped wall and said second sloping triangularly shaped wall in close proximity to said apex wherein said apex forms a tunneling means for directing an animal down said staircase and into the confines of said housing;

wherein a leg of said first triangularly shaped wall and a leg of said second triangularly shaped wall are fixedly coupled to the top surface of said lid member wherein the leg of the first wall and the leg of the second wall surrounds a triangular aperture formed in said lid member.

6. The subterranean animal sanctuary of claim 5, wherein said sanctuary foyer further comprises:

a front triangular wall having formed therein an entry point aperture;

a pivot hinge member coupled to said front triangular wall; and a flap member coupled to said pivot hinge member and dimensioned to cover said entry point aperture wherein said flap member freely rotates in and out of said entry point aperture for providing unhindered entry and exit of an animal.

* * * * *